United States Patent [19]

Buchl et al.

[11] Patent Number: 4,825,655
[45] Date of Patent: May 2, 1989

[54] MASTER/SLAVE HYDRAULIC SYSTEM WITH REBOUND COMPENSATION

[76] Inventors: Andrew F. Buchl, 401 9th Ave. SW., Rugby, N. Dak. 58368; John C. Stephenson, 138 Frobisher Crescent, Saskatoon, Canada S7K4Y5

[21] Appl. No.: 914,505

[22] Filed: Oct. 2, 1986

Related U.S. Application Data

[63] Continuation of Ser. No. 750,482, Jun. 28, 1985, abandoned.

[51] Int. Cl.$^4$ ............................................. F15B 7/00
[52] U.S. Cl. ................................... 60/546; 60/579
[58] Field of Search .............. 60/546, 579, 581, 591; 91/171, 189 R, 520, 443

[56] References Cited

U.S. PATENT DOCUMENTS

| | | | |
|---|---|---|---|
| 4,140,152 | 2/1979 | Budzich | 137/596.2 |
| 4,221,266 | 9/1980 | Fardal | 172/4 |
| 4,337,959 | 7/1982 | Bettin | 280/43.23 |
| 4,354,688 | 10/1982 | Swanson | 280/43.23 |
| 4,381,036 | 4/1983 | Fardal | 172/2 |
| 4,409,884 | 10/1983 | Boehringer | 91/520 |
| 4,420,934 | 12/1983 | Udono | 91/520 |
| 4,423,664 | 1/1984 | Buchl | 91/1 |
| 4,437,309 | 3/1984 | Suzuki | 60/591 |
| 4,439,986 | 4/1984 | Snitgen | 60/591 |
| 4,506,898 | 3/1985 | Herron | 91/189 R |
| 4,507,923 | 4/1985 | Trabbic | 60/591 |
| 4,567,727 | 2/1986 | Grams | 60/579 |

*Primary Examiner*—Edward K. Look
*Assistant Examiner*—Thomas Denion
*Attorney, Agent, or Firm*—Merchant, Gould, Smith, Edell, Welter & Schmidt

[57] ABSTRACT

A master/slave hydraulic system (10) comprises a master cylinder (12), slave cylinders (14–22), and a rebound compensator (72) for eliminating the effects of expansibility in the system on the lower stroke of the cylinders so that accurate depth control across an agricultural implement can be achieved and maintained. The rebound compensator (72) includes a direct pressure reducing and relieving valve (74) and a check valve (86). A flow restrictor (90) is preferably provided on the high-pressure supply port of the pressure reducing and relieving valve (74).

6 Claims, 1 Drawing Sheet

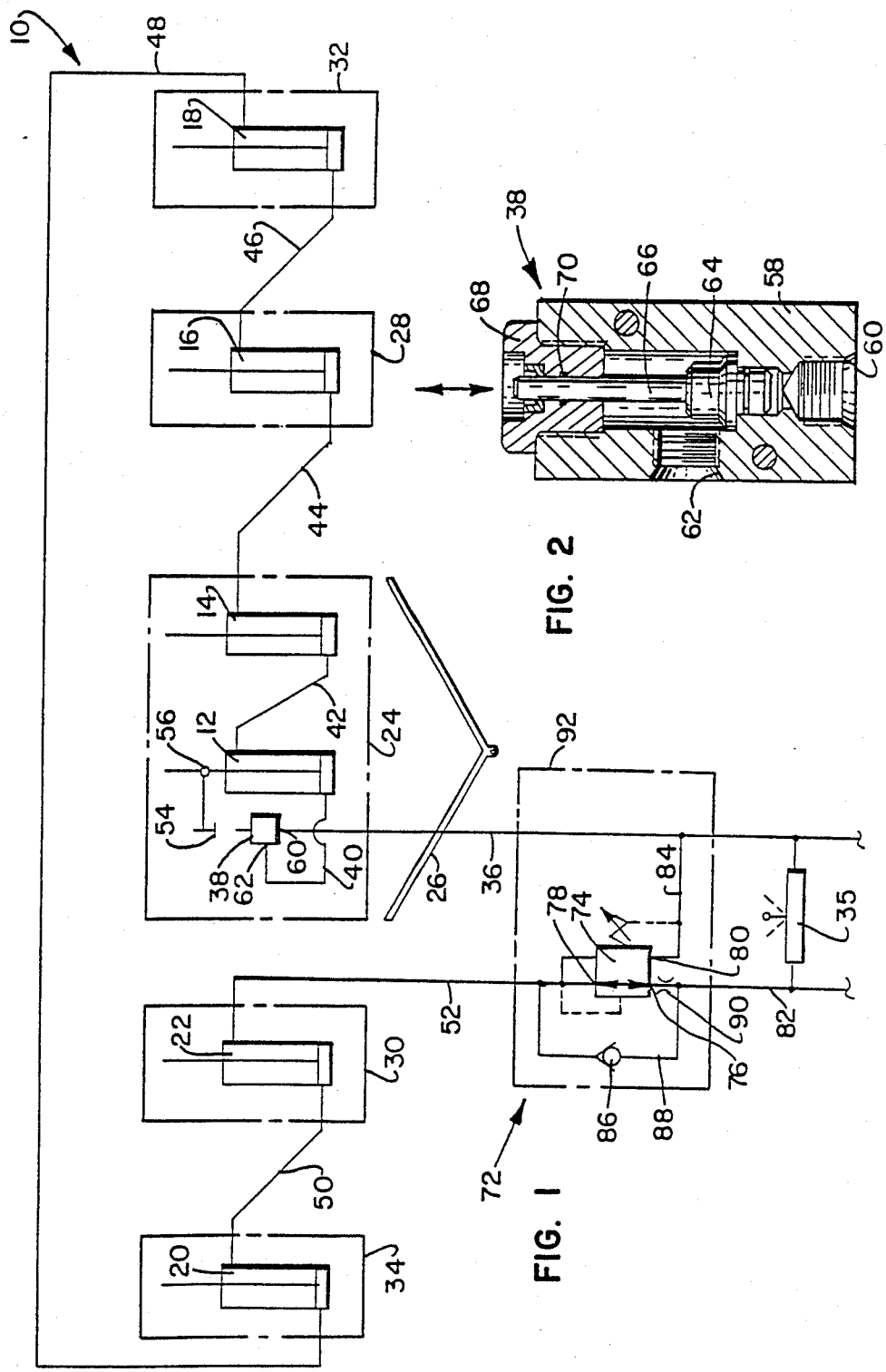

MASTER/SLAVE HYDRAULIC SYSTEM WITH REBOUND COMPENSATION

This is a continuation, of application Ser. No. 750,482, filed June 28, 1985, now abandoned.

TECHNICAL FIELD

The present invention relates generally to a master/slave hydraulic system. More particularly, this invention concerns a master/slave hydraulic system which is adapted for use with agricultural implements, incorporating a valve arrangement connected between the supply and return lines to eliminate rebound or variation between positioning of the slave cylinders for precise depth control.

BACKGROUND ART

In farm implements, depth control of the working tools in the soil is important to success of the operation. In the past, some implements, such as cultivators, were used primarily for weed control where precise tool depth in the soil was important but not critical. More recently with increasing emphasis on minimal tillage techniques, the requirement for precise depth control of the working tools has become critical. The tools of such implements are typically positioned between raised and lowered positions by a master/slave hydraulic system incorporating multiple cylinders located at intervals across the implement, which can be up to about thirty-five (35) feet or more in width. Such systems generally incorporate a single master cylinder which in turn controls several slave cylinders connected in series to the master cylinder, which in turn is controlled by a reversible flow control, center detent valve on the tractor supplying the operating pressure.

"Rebound", however, has been a long-standing obstacle to achieving precise depth control in agricultural implements with the master/slave hydraulic systems of the prior art. Rebound occurs from the expansion of the various hoses, fittings, fluid and other components during the process of lowering the tools to the desired working depth, which is usually set by means of a hydraulic stroke control or mechanical stop at the master cylinder. When the stop is engaged, the hydraulic pressure in the system continues to build causing a slight expansion of the system components. When this pressure is relieved, which typically occurs through leakage across the reversible control valve, the slave cylinders become slightly displaced by the "extra" hydraulic fluid as these components relax. This displacement is cumulative depending upon the distance of the slave cylinder from the master cylinder. For example, in a three-section implement utilizing one master cylinder and three slave cylinders, variance between positioning of the slave cylinders can range up to about three-eighths (⅜) of an inch. In a five-section implement incorporating one master cylinder and five slave cylinders, positioning of the rods of the slave cylinders can vary up to about three-fourths (¾) of an inch across the implement. This of course makes it extremely difficult to maintain precise depth control to the degree required in modern farming techniques, particularly minimum tillage seedbed preparation wherein consistent placement of the chemical, seed and fertilizer at precise depths is required.

Various attempts have been made to solve the problem of rebound in such master/slave hydraulic systems. For example, one major manufacturer of farm implements utilizes two master cylinders, one for controlling a series of slave cylinders on each side of the implement. This is relatively expensive and reduces but does not eliminate rebound of the slave cylinders, although the rebound is the same between corresponding slave cylinders on opposite sides of the implement. Another approach has been simply to reduce pressure in the return line with a pressure relief valve, however, this results in uncontrolled flow, thus dumping system pressure, which also affects operation of the control detent valve. Others have used a check valve to lock the system at a high pressure which aggravates rebound, and results in complete dumping of pressure if the operator manipulates the control detent valve for adjustment. The most common approach to the rebound problem has been to make the necessary adjustments to the cylinders in the field, however, this is not efficient or practical. Otherwise, the problem of rebound has heretofore defied solution. Some have characterized rebound as an inherent problem in such master/slave hydraulic systems.

There is thus a need for an improved master/slave hydraulic system which eliminates rebound and is thus adapted for use on agricultural implements requiring precise depth control.

SUMMARY OF INVENTION

The present invention comprises an improved master/slave hydraulic system which overcomes the foregoing and other difficulties associated with the prior art. In accordance with the invention, there is provided a master/slave system including a rebound compensator connected between the supply and return lines to reduce and control pressure on the downward or lower cylinder stroke so that the system components do not overly expand, which would otherwise induce rebound. By preventing the initial system pressure expansion during the lower stroke, the components retain their natural configurations and do not later contract and bleed off excess pressure. The rebound compensator comprises a unique valve arrangement including a pressure reducing valve and a check valve. In accordance with the preferred construction, a flow restrictor is also provided.

BRIEF DESCRIPTION OF DRAWINGS

A better understanding of the invention can be had by reference to the following Detailed Description in conjunction with the accompanying Drawing, wherein:

FIG. 1 is a schematic diagram of a hydraulic master/slave system incorporating the invention; and FIG. 2 is an enlarged cross-sectional view of a poppet valve.

DETAILED DESCRIPTION

Referring now to the Drawing, wherein like reference numerals designate like or corresponding elements between the views, and particularly referring to FIG. 1, there is shown in schematic form a hydraulic master/slave system 10 incorporating the invention. The system 10 is shown as being of the five-section-type, however, it will be understood that the invention is also adapted for three-section systems, which are the two most popular systems utilized in aricultural implements. The number of sections in system 10 is not critical to practice of the invention, although the potential rebound and thus importance of the invention increase with the number of sections.

In particular, system 10 includes a master cylinder 12 and five slave cylinders 14, 16, 18, 20 and 22 connected in series. Each of the cylinders 12-22 is of the double-acting-type including a cylinder with ports on opposite sides of a movable piston secured to a piston rod as shown. The piston rods of the cylinders are usually coupled between the carrier wheels and a frame supporting soil working tools (not shown) which must be positioned at predetermined precise soil depths. The cylinders 12-22 are a series plumbing of cylinders with the bores and rod diameters sized such that all the cylinder rods move in equal amounts when operating so that displacement of the piston in the master cylinder 12 theoretically causes a like displacement in the slave cylinders 14-22. A slotted barrel, drilled barrel or piston bypass arrangement is typically provided to automatically bypass fluid in the fully extended position. As will be explained more fully hereinafter, such master/slave systems operate under high pressures such that the effects of expansibility of the components and compressibility of the fuild are noticeable, which in turn causes rebound or a variation in the positioning of the slave cylinders 14-22.

The master/slave system 10 is illustrated as being mounted on a five-section farm implement, such as an air seeder or cultivator. The master cylinder 12 and first slave cylinder 14 are mounted on the center section 24 of the implement, which is towed behind a tractor (not shown) by means of a tow bar or hitch 26. The second slave cylinder 16 and fifth slave cylinder 22 are mounted on the inboard pivotal sections 28 and 30, respectively, of the implement. the third slave cylinder 18 and fourth slave cylinder 20 are mounted on the outermost pivotal implement sections 32 and 34, respectively.

Positioning of the slave cylinders 14-22 is controlled by the master cylinder 12, which in turn is actuated by a reversible control valve 35 on the tractor supplying hydraulic fluid under pressure to the system 10. The reversible control valve 35 is shown as being of the conventional detent type having a lever which snaps back to the neutral center position when the line pressure exceeds a predetermined pressure in the raise or lower positions.

Displacement of the master cylinder 12 causes similar displacement of the slave cylinder 14-22 in the well-known manner. In particular, a line 36 is connected to a poppet valve 38 which in turn is connected by line 40 to the closed or cylinder end of the master cylinder 12. When fluid under pressure is supplied by valve 35 to line 36, it flows through the poppet valve 38 and line 40, into the closed end of the master cylinder 12 causing extension of the piston and rod thereof. Fluid displacement from the rod end of the master cylinder 12 is directed by line 42 to the closed or cylinder end of the first slave cylinder 14 causing extension of its piston and rod. Similarly, fluid displaced from the rod end of the first slave cylinder 14 is directed by line 44 to the closed or cylinder end of the second slave cylinder 16 causing extension thereof. Fluid displacement from the rod end of the second slave cylinder 16 is directed by line 46 to the closed or cylinder end of the third slave cylinder 18 causing extension thereof. Fluid displaced from the rod end of the third slave cylinder 18 is directed by line 48 to the closed or cylinder end of the fourth slave cylinder 20 causing displacement thereof. Fluid displacement from the rod end of the fifth slave cylinder 22 is directed back to the tractor via line 51. Lines 36 and 52 thus function as the supply and return lines. When fluid is supplied via line 36 and returned via line 52, cylinders 12-22 raise the implement. When flow is reversed and fluid is supplied to line 52 and returned via line 36, cylinders 12-22 retract and lower the implement to the desired depth.

Referring to FIGS. 1 and 2, hydraulic depth control is accomplished by means of the poppet valve 38 and a stop 54 which is adjustably secured by a fitting 56 to the piston rod of the master cylinder 12. The poppet valve 38 is normally open. As is best seen in FIG. 2, the poppet valve 38 comprises a case 58 defining a chamber with two ports 60 and 62. A valve member 64 is mounted for movement between open and closed positions on a seat defined within the case 58. The valve member 64 is secured to the inner end of a stem 66 which is slideable within a plug 68 mounted in one end of the case 58. A seal 70 is provided between the stem 66 and plug 68.

Fluig supplied to port 60 via line 36 lifts and flows past the valve member 64, out of port 62 through line 40 into the closed or cylinder end of the master cylinder 12 to effect extension and thus raise the implement. Upon retraction of the master cylinder 12 when flow is reversed, the stop 54 engages the outer end of stem 66 to shut off fluid flow and thus stop retraction of master cylinder 12 in the desired lowered position or depth. However, after the desired cylinder positioning and thus working depth is achieved, the hydraulic pressure within system 10 continues to cause slight expansion of the various lines, fittings and other components until the tractor detent or set pressure is reached. As this excess pressure is relieved, typically by leakage through the tractor valve 35, the last slave cylinder 22 in the system 10 is slightly displaced by the "extra" hydraulic fluid stored in the expanded hoses and fittings as they return to their original configurations, causing rebound.

Referring again to FIG. 1, in order to eliminate such rebound, a compensator 72 is connected across lines 36 and 52 between the control detent valve 35 and the master/slave system 10. The compensator 72 preferably comprises a spool-type, pilot-operated, adjustable cartridge-type, pressure reducing and relieving valve 74. In particular, the valve 74 includes ports 76, 78 and 80. The high-pressure supply port 76 of valve 74 is connected to line 82 leading to the return or lower side of the tractor control valve 35. The regulated (reduced) pressure port 78 is connected to line 52 leading to the rod end of the last slave cylinder 22. The return or pressure relief port 80 of valve 74 is connected by line 84 to line 36 extending between the reversible control valve 35 on the tractor and poppet valve 38. The valve 74 is preferably pilot operated and adjustable. Any suitable valve of this type, which is available for various commercial sources, can be utilized. For example, the Model PRV2 valve from Modular Controls of Villa Park, Ill., can be used for valve 74.

A check valve 86 is provided in a line 88 connected across the pressure reducing and relieving valve 74 between lines 52 and 82. In accordance with the preferred construction, a flow restrictor 90 is provided on the high-pressure or supply port 76 of the pressure reducing and relieving valve 74 to increase life and reduce wear associated with chatter and hydraulic hammering effects in the circuit. For example, a flow restrictor 90 with 7/64-inch diameter orifice has been found satisfactory. The components of compensator 72 comprising valve 74, check valve 86 and flow restrictor 90 are all preferably housed in a block 92.

The hydraulic master/slave cylinder system 10 with rebound compensator 72 operates as follows. On the raise stroke, fluid under pressure is supplied to system 10 via line 36, extending master cylinder 12 and slave cylinders 14–22 as described above. The return flow passes through line 52 and bypasses the pressure reducing and relieving valve 74 via check valve 86 and line 88. System 10 operates at full pressure and no pressure reduction or relief occurs on the raise stroke.

The rebound compensator 72 comes into play on the lower stroke where depth control and the effects of rebound are critical. The typical operating pressure of a tractor is 2,500 psi. On the lower stroke, flow is reversed with valve 35, and fluid under pressure is supplied through line 82 and restrictor 90 to shift the spool of the pressure reducing and relieving valve 74, which is preferably adjusted to limit pressure in line 52 and system 10 to about 450 psi to 650 psi which is typically sufficient to raise the implement carrier wheels off the ground thus permitting full working depth of the implement. The stop 54 engages poppet valve 38 to position cylinders 12–22 as desired. Also, in a master/slave system where a pressure of 450–650 psi would be locked in, effective componentry expansion would be to stabilize the implement sections without effects of rebound. It has been found that the rebound effect is most noticeable at system pressures above 700 psi. Any flow through bypass line 88 is blocked by check valve 86. Excess pressure is relieved via line 84 to line 36, which functions as the return line in the lower stroke. Operation of the tractor control detent valve 35 is not affected.

From the foregoing, it will thus be apparent that the present invention comprises an improved master/slave hydraulic system having a compensator which eliminates the rebound problem associated with such systems in the prior art so that accurate depth control can be achieved and maintained across an agricultural implement.

Although particular embodiments of the invention have been illustrated in the accompanying Drawing and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. In a hydraulic system including a reversible control valve actuating a master cylinder fluidly connected in series with a plurality of slave cylinders, between raised and lowered positions, the improvement comprising:
   a direct pressure reducing and relieving valve having a high-pressure supply port fluidly connected to one side of the control valve, a reduced pressure supply port fluidly connected to the endmost slave cylinder, and a pressure relief port fluidly connected to the other side of the control valve and to the master cylinder;
   a check valve fluidly connected across said direct pressure reducing and relieving valve, between said endmost slave cylinder and said one side of the control valve; and
   a flow restrictor fluidly connected between said one side of the control valve and the high-pressure supply port of said direct pressure reducing and relieving valve.

2. A master/slave hydraulic system for precise depth control of soil-working tools on an agricultural implement, comprising:
   a reversible control valve having raise and lower ports;
   a master cylinder having a movable rod and raise and lower ports;
   a plurality of slave cylinders connected in series with said master cylinder, each slave cylinder including a movable rod and raise and lower ports;
   a pressure reducing and relieving valve having a high-pressure supply port fluidly connected to the lower port of said control valve, a reduced pressure supply port fluidly connected to the lower port of the endmost slave cylinder, and a pressure relief port fluidly connected to the raise port of said master cylinder and to said control valve;
   means associated with said master cylinder for limiting stroke of the rod in said master cylinder;
   a check valve connected across said pressure reducing and relieving valve between the lower port of said control valve and the lower port of said endmost slave cylinder; and
   a flow restrictor connected to the high-pressure supply port of said direct pressure reducing and relieving valve.

3. The master/slave hydraulic system of claim 2, wherein said pressure reducing and relieving valve is of the pilot-operated, adjustable spool-type.

4. A master/slave hydraulic system for precise depth control of soil-working tools on an agricultural implement, comprising:
   a reversible control valve having raise and lower ports;
   a master cylinder having a movable rod, a raise port, and a lower port;
   a normally open poppet valve connected between the raise port of said control valve and the raise port of said master cylinder;
   an adjustable stop mounted on the rod of said master cylinder for engagement with said poppet valve in order to close fluid communication between said control valve and said master cylinder and thus limit stroke of the rod in said master cylinder;
   a plurality of slave cylinders connected in series with said master cylinder, each slave cylinder including a movable rod and raise and lower ports;
   a direct pressure reducing and relieving valve having a high-pressure supply port fluidly connected to the lower port of said control valve, a reduced pressure supply port fluidly connected to the lower port of the endmost slave cylinder, and a pressure relief port fluidly connected to the raise port of said control valve;
   a check valve fluidly connected across said direct pressure reducing and relieving valve between the lower port of said control valve and the lower port of said endmost slave cylinder; and
   a flow resistor fluidly connected between the lower port of said control valve and the high-pressure supply port of said direct pressure reducing and relieving valve.

5. A rebound compensator for use in a master/slave hydraulic system including a reversible control valve fluidly connected between two lines for supply and return of fluid under pressure, one line being fluidly connected to a master cylinder and the other line being fluidly connected to an endmost slave cylinder which is fluidly connected in series with at least one other slave cylinder and the master cylinder, which compensator comprises:
  a direct pressure reducing and relieving valve having a high-pressure supply port for fluid connection to one side of the control valve, a reduced-pressure supply port for fluid connection to the endmost slave cylinder, and a pressure relief port for fluid connection to the other side of the control valve and to the master cylinder;
  a check valve fluidly connected across said direct pressure reducing and relieving valve, between said endmost slave cylinder and said one side of the control valve; and
  a flow restrictor fluidly connected between said one side of the control valve and the high-pressure supply port of said direct pressure reducing and relieving valve.

6. The rebound compensator of claim 5, wherein said direct pressure and relieving valve is of the pilot-operated, adjustable spool-type.

* * * * *

UNITED STATES PATENT AND TRADEMARK OFFICE
CERTIFICATE OF CORRECTION

PATENT NO. : 4,825,655
DATED : May 2, 1989
INVENTOR(S) : Andrew F. Buchl

It is certified that error appears in the above-identified patent and that said Letters Patent is hereby corrected as shown below:

Column 3, line 46, change "cylinder" to --cylinders--.

Column 3, lines 53 and 54, change "displacement" to --displaced--.

Column 3, line 60, change "displacement" to --displaced--.

Column 3, line 66, after "thereof." insert --Fluid displaced from the fourth slave cylinder 20 is in turn directed by line 50 to the closed or rod end of the fifth slave cylinder 22 causing extension thereof.--

Column 3, lines 66 and 67, change "displacement" to --displaced--.

Column 3, line 68, change "51" to --52--.

Column 4, line 20, change "Fluig" to --Fluid--.

Column 6, lines 37 and 38, change ", a raise port, and a lower port" to --and raise and lower ports--.

Signed and Sealed this

Twenty-seventh Day of February, 1990

Attest:

JEFFREY M. SAMUELS

Attesting Officer    Acting Commissioner of Patents and Trademarks